March 13, 1956  C. H. COUGHLIN ET AL  2,737,834
AUTOMATIC CONVEYOR SYSTEM FOR BILLETS
Filed Nov. 1, 1952  2 Sheets-Sheet 1

INVENTORS.
Cornelius H. Coughlin.
Robert Lawrence.
Charles W. Mote.
BY
Harness and Harris
ATTORNEYS.

March 13, 1956  C. H. COUGHLIN ET AL  2,737,834
AUTOMATIC CONVEYOR SYSTEM FOR BILLETS
Filed Nov. 1, 1952  2 Sheets-Sheet 2

INVENTORS.
Cornelius H. Coughlin
Robert Lawrence
Charles W. Mote
BY
Harness and Harris
ATTORNEYS.

United States Patent Office 2,737,834
Patented Mar. 13, 1956

2,737,834

AUTOMATIC CONVEYOR SYSTEM FOR BILLETS

Cornelius H. Coughlin, Robert Lawrence, and Charles W. Mote, Detroit, Mich., assignors to Chrysler Corporation, Highland Park, Mich., a corporation of Delaware Application November 1, 1952, Serial No. 318,198

9 Claims. (Cl. 80—26)

This invention relates generally to an automatic conveyor system for billets, particularly crankshaft billets and other billets which are adapted to be rolled so as to redistribute the metal in the billet for facilitating the forging thereof. The invention further relates to a means for forming one end of a billet so that the same may be readily drawn through forging rolls and to adapt the billet for tong handling of the same during a subsequent drop forging operation. Specifically, the invention is directed to a system for intermittently conveying billets to the forging rolls for the reasons hereinafter more particularly set forth.

One form of commercial rolls for redistributing the metal of a billet and forming a conveniently graspable end thereon, is arranged to perform one 360° revolution of operation at a time, before returning to the same relatively stopped position of angularity for starting the next complete revolution. According to a prior known technique of operation, a continuously moving series of billets is fed into such rolls and as each billet passes a conventionally provided rolls-controlling-trip, the rolls are set in revolution so as to engage the moving billet and to accordingly redistribute the metal thereof without interfering with the continuous movement of the billet. Due to slight variations in the speeds of travel of the different billets, due to other variables such as fluctuations in time lag between actuation of the rolls-controlling-trip and the start of a revolution of roll operation, and due to further complications arising from trying to coordinate the approach of two bodies both of which are moving, operations according to the foregoing prior known technique sometimes produce billets having non-uniformly formed ends. That is to say, the graspable end of one billet may be relatively long, whereas the graspable end of another billet may be relatively short. If too short, the graspable end as formed presents a problem in proper handling of the billet with tongs, and if too long, the graspable end as formed represents a waste of available heated metal inasmuch as the graspable end of a crankshaft billet, for instance, is sheared off and scrapped before the crankshaft is center drilled and finished to final form.

An object of the present automatic conveyor system for billets is to convey each billet into a fully stopped, definitely located position with relation to the feed side of a temporarily idle set of rolls, whereupon the rolls when actuated and caused to revolve through a cycle, will engage each billet in a uniform manner and in the same relative position on each billet. Thus the formed end for any one billet will be substantially the same in length and formation as that of every other one of the billets, and the billets can all be uniformly handled by the tongs provided for grasping the billet ends.

According to a feature of this billet stopping and roll forming invention, a billet engaging, machinery actuating member is adapted to be intermittently interposed in the reducer rolls in the path of the billets. The adjusting member is pivotally carried so as to be struck by the billet and is adapted to be swung free of the rolls in event that the roll operation occurs before the actuating member is removed from the interposed position. To this end, the actuating member is slidably mounted to a carriage supported at two spaced-apart points, one of which is occupied by a fixed pivot, and the other of which is occupied by a shear pin. Any transversely directed thrust on the slidable member is transmitted through the carriage to the shear pin which, when sheared off as a result of the impact of the thrust, permits the member and carriage to swing about the remaining point of pivotal support. According to a further feature of the invention, a pair of safety dogs is provided on the leading face of the rolls for providing a thrust which will knock the actuating member free by shearing off the shear pin.

A further object of the invention is to provide a set of billet-forming rolls having a feed conveyor therefor, a billet-operated safety device adjacent such conveyor which permits operation of the rolls only when the device is tripped by a billet approaching the rolls on the conveyor from the feed side of the rolls.

Another object is the provision, in conjunction with a billet-stopping apparatus on the feed side of a set of forming rolls, of a mechanism for setting the rolls in motion when the billet is advanced and brought to a halt in the appropriate stopped position.

Further features, objects, and advantages will either be specifically pointed out or become apparent when for a better understanding of the invention, reference is made to the following written description taken in conjunction with the accompanying drawings in which:

Figure 3 is a transverse section through the transmission of Figure 2 taken along the section lines 3—3 thereof;

Figure 5 is a sectional view of a control valve for controlling the application of fluid pressure to the transmission elements of Figure 2.

Figure 1:
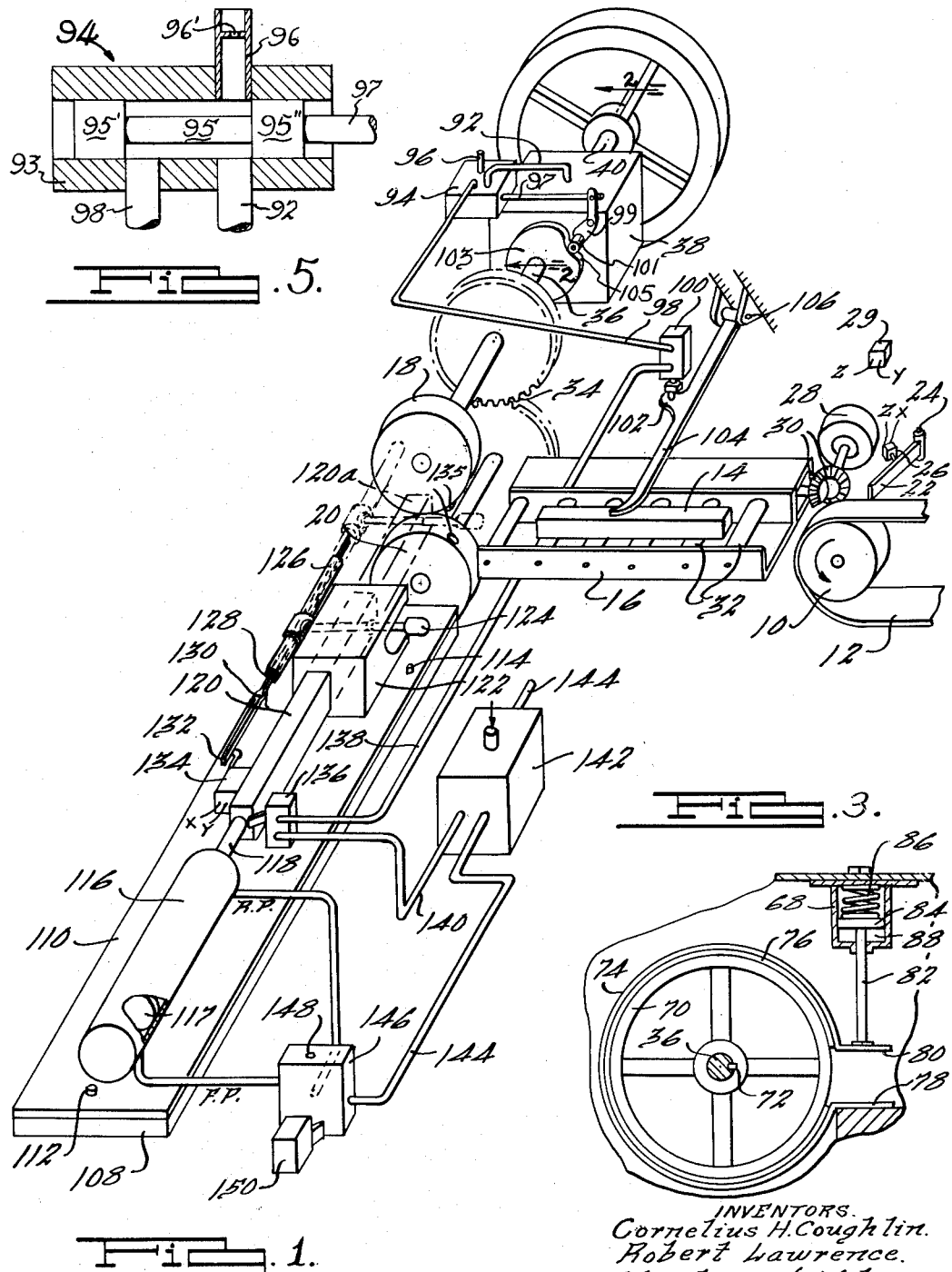
Figure 1 is a diagrammatic perspective view of apparatus constructed in accordance with the present invention.
Figure 2:
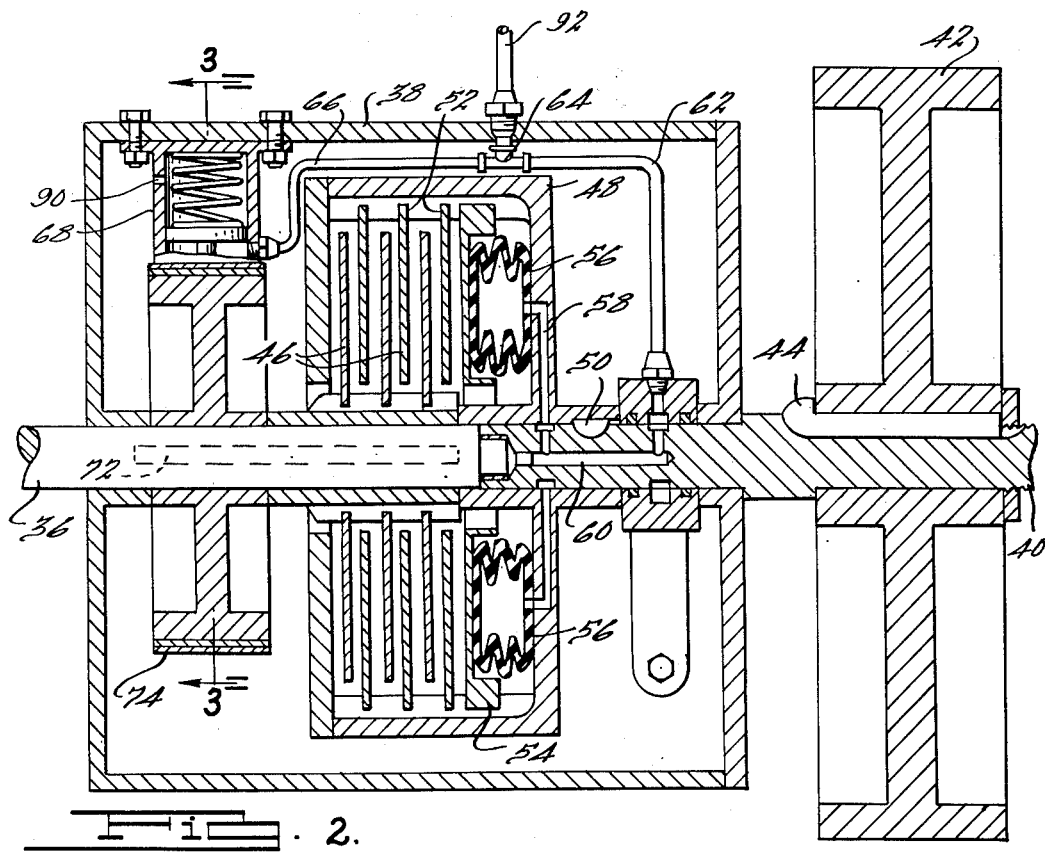
Figure 2 is a longitudinal sectional view of a transmission along the section lines 2—2 appearing in Figure 1.

In Figures 1–3 of the drawings, a main conveyor 10 is shown having a roller-supported belt 12 providing for the continuous travel of crankshaft billets therealong. From the main conveyor 10 the billets, a typical one of which is indicated at 14, are passed to an intermediate or feed conveyor 16 which feeds billets one at a time into a reducer roll composed of an upper and a lower roll, which are figuratively shown at 18 and 20 respectively. According to the present fanciful showing, the periphery of the rolls 18, 20 is shown to be cylindrical, but actually such surface is deeply indented to various depths and greatly restricted in portions so as to form, flatten, and reduce any billet passing between the upper and the lower rolls 18, 20. A link 22 fixedly and pivotally supported at 24, has its outer end disposed adjacent the belt 12 in the immediate path of the billets passing therealong and has a mid portion for engaging an on-off switch 26 which is normally open. The link 22 is arranged to hold the switch 26 closed at all times that a passing billet is engaging the outer end of the link, and in such instance the switch 26 completes a circuit from a power source to an energizeable motor 28 and also to a relay 29 as will be hereinafter more completely described.

The motor 28 constitutes a means for driving the intermediate conveyor 16 through a series of bevel gears 30 and a drive shaft which is geared to a set of synchronized rollers 32 incorporated in the conveyor 16 for forcibly causing billets, such as at 14 to travel along the latter.

The billets are thus fed into the reducer rolls 18, 20. These rolls 18, 20 are mutually synchronized through a pair of spur gears 34, one on the shaft of each roll, and the entire assembly is powered by a shaft 36 forming the output shaft of a transmission 38.

The transmission 38 also has a constantly rotating input shaft 40 which is power driven, and carries thereon a heavy fly wheel 42 which is locked to the shaft 40 by means of a gib head key 44. The transmission output shaft 36 has an inner spline on which is carried one set 46 of two sets 46, 52 of disc-type clutch plates. A drum 48, which is keyed at 50 to the input shaft 40, carries an outer set of splines which carries the set of clutch plates 52. The two sets of clutch plates 46, 52 may, by leftward movement of a shoe 54, Figure 2, be compressed into a tight stack at the left end of the drum 48 to provide a 1:1 or direct drive between the input shaft 40 and the output shaft 36 of the transmission 38.

A bellows-like rubber air bladder 56 is provided to actuate and move the shoe 54 to the left when the bladder 56 is expanded by internal air pressure which may be supplied thereto through a communicating set of two or more radially extending passages 58 formed in the hub and one end of the drum 48. The radial passages 58 are fed from a short central passage 60 drilled in the input shaft 40 and supplied in known manner from a rotatable type sealed air coupling to which is connected an air pipe 62. The air pipe 62 is connected to one branch of a T 64 which has and similarly supplies another branch 66 connected to a spring-operated motor 68.

The motor 68 is located adjacent a pulley-like wheel 70 which is keyed at 72 to the transmission output shaft 36. The wheel 70 is arranged to be braked by an encircling brake band 74 which is faced with an inner sheet of friction material 76. At one end, indicated at 78, the brake band 74 is fixed, whereas the brake band 74 has the other end 80 thereof free to be moved by and connected to a piston rod 82 which is secured to a spring-loaded piston 84 provided in the motor 68. The piston 84 is energized by a precompressed coil spring 86. Due to the precompression of the spring 86, the spring-operated motor 68 is normally arranged to set the brake band 74 and prevent the wheel 70 and the output shaft 36 from moving. Whenever air under sufficient pressure, however, is fed from the line 66 into a chamber 88 below the piston 84, the resistance of the spring 86 is overcome causing the piston 84 to be moved upwardly in the motor 68 and exhausting air from the spring chamber through a vent opening 90 provided in the case of the motor 68. Compressed air is supplied to the T 64 in the transmission 38 through an inlet pipe 92.

A speed responsive timing mechanism 94, vented at 96, controls the admission of air from a pipe 98 into the pipe 92 in a known conventional manner in which successive cycles of the reducer rolls 18, 20 are prevented from occurring except after a predetermined interval has occurred following completion of each cycle. Thus the brake band 74 is normally set to prevent any operation of the reducer rolls 18, 20 and as cyclic operation is permitted by the control device 94, air pressure is permitted to be applied to the pipe 92 and supplied to the transmission 38 which simultaneously causes the release of the brake 74 and causes the sets of clutch plates 46, 52 to engage and transmit torque from the constantly rotating input shaft 40 to the rotative output shaft 36. On completion of any one cycle of the reducer rolls 18, 20, the vented control device 94 prevents further re-admission of air through the pipe 92 and thus prevents further re-energization of the reducer rolls 18, 20 prior to elapse of a predetermined time interval.

The air pipe 98 has a stem-actuated normally closed air valve 100 in series therewith which is actuated upwardly into open position whenever the valve stem is engaged by a lateral outrigger portion 102 formed on an actuating link 104. The valve stem and the actuating link 104 in effect form a plunger-type mechanism and the actuating link 104 is fixedly pivotally supported by a support 106 at one end, and has the other end disposed adjacent the intermediate conveyor 16 in the path of travel of each billet such as the one which is indicated at 14. Thus the presence of each passing billet on the conveyor 16 causes the plunger mechanism of valve 100 to be moved from the normally closed safety position into the upwardly open position. When the plunger-type actuating mechanism for the valve 100 is unactuated, the valve 100 is closed and disables the air circuit 98 leading to the reducer rolls transmission 38 and thus acts as a safety valve to prevent operation of the rolls 18, 20. Actuation of the plunger-type mechanism for the valve 100 causes the valve itself to be disabled so as to open the air circuit 98.

For the purpose of more particularly describing the structure of the control valve 94, reference will be made to Figures 1 and 5. The valve 94 comprises a hollow valve body 93 having a hollow interior, the pressure supply line 98 and line 92 communicating with the interior of the valve body 93 as indicated. A movable spool valve element 95 may be slidably received within the hollow interior of the valve body 93, said valve element 95 including a pair of spaced valve lands 95' and 95''. The movable valve element 95 may be operatively connected to a valve actuator shaft 97 which is actuated by a crank member 99. Cam element 101 is carried by one end of the crank member 99 and is adapted to ride upon the cam surface of the cam member 103, the latter being powered by shaft 36 and situated in concentric relationship with respect to the upper spur gear 34 and the roll 18. A recess 105 is formed on the surface of the cam member 103 and the cam follower roller 101 is adapted to engage the recess 105 during the period in which the rolls 18 and 20 are inactive. The valve element 95 will then assume the right hand position, as shown in Figure 5, to allow communication between the supply pressure line 98 and the line 92. The vent 96 communicates with the lines 98 and 92 when the valve element is in the right hand position as shown. This vent 96 may include an air flow restricting orifice means 96'.

Adjacent the near side of the reducer rolls 18, 20, viewed in Figure 1, a fixed supporting slab 108 is provided for supporting a table 110 in a generally transverse relationship to the path of travel of billets through the reducer rolls 18, 20. The table 110 is pivoted at 112 to the supporting slab 108 and is additionally connected at a point spaced apart from the fixed pivot 112 by means of a shear pin 114 which is received in registering apertures formed in the table 110 and in the supporting slab 108. The shear pin 114 provides somewhat of a resistive connection between the table and slab 110, 108 but under sufficient loading will shear apart to permit the transversely disposed table 110 to swing to the left, as viewed in Figure 1, about the pivot 112 as a swing axis.

A penumatic reciprocating motor 116 of the double-acting type is mounted to the table 110 and has a pressure movable piston member 117 therein to which there is secured a piston rod 118 extending externally of the motor 116. The piston rod 118 is in turn connected, externally with respect to the motor 116, to a slide 120 which is slidably related to a carriage 122 mounted directly to the table 110. The slide 120 is apertured to receive a billet-stopping plunger 124 which is carried by the slide 120 so as to be permitted slight relative movement with respect thereto. One end of the billet-stopping plunger 124 obstructs the path of the billets, whereas the opposite end of the billet-stopping plunger 124 is affixed to a tube 126 which telescopically receives one end of a lever 128 having a pivot 130 at the mid portion thereof for pivoting the lever to the table 110. The lever 128 has an opposite end 132 which engages a two-position micro-switch 134 subsequently to be described.

Actuation of the double-acting pneumatic motor 116 in one direction causes the piston rod 118 and the slide 120 to be advanced into a dotted line position indicated by the dotted line showing 120ª in Figure 1, whereby the slide 120 obstructs the path of travel of billets between the reducer rolls 18, 20 and presents the billet-stopping plunger 124 so that the latter engages and positively stops any billet which advances into the vicinity thereof at that time. Each of the rolls 18, 20 incorporates a safety dog 135 which cooperates with the safety dog on the opposing roll to strike the slide 120 and knock the same free of the reducer rolls 18, 20 which is accomplished by causing the shear pin 114 to fail, and by causing the entire carriage and table assembly 110 to be pivoted about the pivot 112. This occurs only in the event that for some reason the slide 120 is not automatically or otherwise retracted in a manner here following, all prior to actuation of the rolls 18, 20.

The reverse actuation of the double-acting motor 116 causes the slide 120 to retract, moving with it the billet-stopping plunger 124 out of the path of the billets. In the retracted position of the slide 120, shown in full lines in Figure 1, a link controlling a stem-operated air valve 136 is engaged by the rear end of the slide 120 and at such time the air valve 136 is held open to open a pipe 138 which supplies the previously noted normally closed air valve 100. The named link and valve stem in effect form a plunger-type mechanism. The valves 136, 100 thus act in series and the air furnished them is supplied from a pipe 140 leading from an air pump 142 which serves as a source of compressed air.

The pump 142 draws in fresh air through an intake pipe 144 and in addition to supplying the pipe 140 also supplies a pipe 144 which leads to a four-way compound valve of known type which is generally represented at 146 and is vented at 148. The four-way air valve 146 is controlled from a dual relay control box 150 so as to supply one end of the motor 116 with compressed air through a forward pipe F. P. and to connect the opposite end of the motor through the reverse pipe R. P. to the vent 148, or in the alternative to supply the appropriate end of the motor 116 with compressed air through the reverse pipe R. P. and to connect the opposite end of the motor 116 through the forward pipe F. P. to the vent 148.

Figure 4:
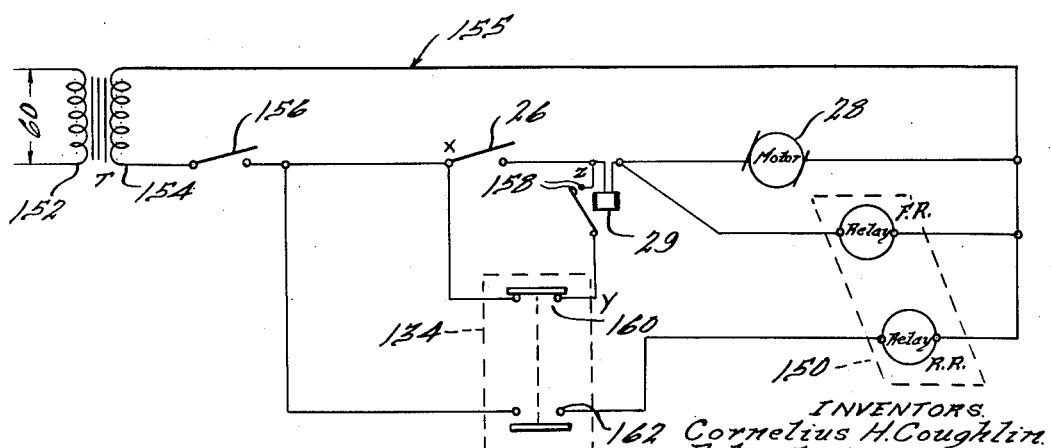
Figure 4 is a diagram representative of the wiring of the apparatus of Figure 1.

In Figure 4, an overall wiring diagram is represented for the apparatus of Figures 1–3 preceding. A transformer T is provided, the primary side 152 of which is supplied with 60 cycle power, and the output or secondary side 154 of which supplies a load circuit 155 controlled by a master switch 156. The previously noted switch 26 which is controlled by the pivoted link 22, is connected to the master switch 156 on one side and on the other side is connected through a holding relay 29 to the drive motor 28 for the intermediate conveyor 16 and to a forward relay F. R. located in the relay control box 150. As will be seen, the forward relay F. R. and the motor 28 are in electrically parallel relationship. Closing of the manual switch 156, followed by closing of the control switch 26 due to movement of a billet along the main conveyor belt 12, will cause the hold relay 29 to close a set of hold contacts 158 provided therefor and at the same time will cause the motor 28 and the forward relay F. R. to be energized. When a billet from the main conveyor 10 has advanced along the intermediate conveyor 16 to a point at which it engages the billet-stopping plunger 124, the micro-switch 134 is actuated whereupon a set of normally closed upper contacts 160 thereof are opened, and a normally open set of contacts 162 thereof are caused to be closed. Ordinarily these normally closed upper contacts 160 permit the holding relay 29 to complete the circuit through the motor 28 and the forward relay F. R. even after the switch 26 and the acting link 22 therefor are restored to their unengaged positions. Actuation of the micro-switch 134, due to movement of the link 128, however, causes the motor 28 to stop, causes the forward relay F. R. to be deenergized, and causes a reverse relay R. R. likewise located in the relay control box 150 to be energized. The relationship between these two relays F. R., R. R. and the air pipes F. P. and R. P. leading to the motor 116 is such that when the forward relay F. R. is energized at a time when the reverse relay R. R. is unenergized, the forward pipe F. R. is connected to pressure and the reverse pipe R. P. is vented to atmosphere whereupon the motor 116 is operated in its forward direction of movement and the slide 120 is held in its forward position 120ª. Reverse action of the reversible motor 116 is brought about due to the fact that actuation of the reverse relay R. R. connecte the reverse pipe R. P. to pressure and the deenergization of the forward relay F. R. causes the forward pipe F. P. to be vented to atmosphere.

The overall operation of the apparatus of Figures 1–4 is as follows. A billet traveling along the main conveyor belt 12 strikes the link 22 which closes the switch 26, causing the drive motor 28 and the intermediate conveyor 16 to be set in operation and also causing the forward relay F. R. to be energized so as to operate the valve 146 and supply the forward pipe F. P. with compressed air from the pump 142. The slide 120 is moved to its advanced position 120ª in which the billet-stopping plunger 124 obstructs the path of travel of billets being advanced by the intermediate conveyor 16. While in transit on the intermediate conveyor 16, a billet such as 14 will strike the link 104 to open the safety valve 100 and prepare the air line 98 leading to the timing device 94 and to reducer rolls transmission 38. Such billet will continue to advance on the conveyor 16 until it is stopped due to a firm engagement of the billet-stopping plunger 124, and at that instant the link 104 and the valve 100 will still retain their upward open-valve position. The plunger 124, which is arranged for slight relative movement with respect to the slide 120, reacts to engagement with the billet by thrusting against the tube 126, the lever 128, and this thrust motion is transferred to the motor stopping micro-switch 134. Thereupon the actuating motor 28 for the conveyor 16 is stopped, the forward relay F. R. connecting the forward pipe F. P. to the compressed air is disconnected therefrom and is opened to vent, and due to closing of the contacts 162 the relay R. R. is energized whereupon the reverse pipe R. P. is disconnected from vent and by appropriate action of the four-way air valve 146 is supplied with compressed air from the air pump 142. The piston rod 118 and the slide 120 are withdrawn from their interposed position 120ª with respect to the reducer rolls and in the last phases of the withdrawal, the rear end of the slide 120 will engage a link provided on and actuating the plunger-controlled air valve 136. Compressed air is thereby permitted to pass through the pipes 140, 138, 98, and 92 so as to be admitted to the transmission case T fitting 64.

Alternatively, of course, the admission of air to the T fitting 64 and the accompanying results can be accomplished by having the slide 120 occupy its rearward position prior to the opening of the preparing valve 100, whereupon an appropriate subsequent engagement of the latter valve operating link 104 either manually or by a billet will open the series-connected pipes 140, 138, 98, and 92. Subject to the control of the speed sensitive timing mechanism 94, which controls the air line 92, the brake 74 is temporarily released under air pressure and the clutch plates 46, 52 are engaged for a sufficient time for the reducer rolls 18, 20 to perform one complete cycle of operation involving 360° of rotation. Thereupon the timing device 94 regulates the air pressure in the pipe 92 so that the brake 74 is re-applied, the clutch discs 46, 52 are permitted to disengage, and the input shaft 40 for the transmission 38 continues to rotate whereas the output shaft 36 is braked and held fast. The apparatus of Figures 1–4 is thereafter ready to receive another billet 14 along the main conveyor 10 and these billets as loaded, are arranged to be spaced apart with sufficient intervals therebetween such that the timing device 94 does not normally cause delay of any part of this cyclical operation.

When the line 98 becomes pressurized following the actuation of the air valve 136, as above described, compressed air is permitted to pass through the hollow interior of the valve body 93 into the line 92 thereby energizing the transmission clutch while simultaneously releasing the transmission brake. Upon subsequent rotation of the cam member during the operation of the reducer rolls 18 and 20, the valve element 95 is moved to the left thereby blocking the line 92 which also serves as the pressure exhaust path for the transmission clutch servo. Upon completion of one revolution of the reducer rolls, the cam follower 101 again enters the cam recess thereby causing the line 92 to become unblocked. The pressure within the transmission clutch servo may then be exhausted through the exhaust vent 96 thereby disengaging the transmission clutch and permitting the transmission brake to become engaged under the influence of the spring 86. The restricted vent orifice 96' functions to create a pressure buildup in the transmission clutch servo and pressure line 92 when the pressure supply line 98 becomes pressurized. However, the restriction provided by the orifice 96' does not affect the ability of the vent means 96 to quickly reduce the pressure within the transmission clutch servo following a complete revolution of the reducer rolls.

As herein disclosed, the invention is shown to incorporate a plurality of different controls including a pneumatically energized control system primarily actuated by the motor-driven slide 120 to cause the conveyor-fed reducer rolls to perform a cycle of operation, an electrically energized control system to cause the above rolls-feeding conveyor to open rate and a combination electropneumatically energized control system to operate the above motor for driving the slide 120. It is evident that no one of the just-enumerated control systems is limited to the assigned form of energization and that the pneumatic energization for the first-named control, for instance, can be readily replaced by an electrically energized system of control of known construction, and that known hydraulic systems or combinations of the same with electrical pneumatic, or electropneumatic systems may conceivably be employed to accomplish the herein desired results. So also the drawing shows a cylinder and reciprocating-piston-type of pressure fluid motor 116 for operating the slide 120, but self-evidently, a suitably geared rotary motor can be used to accomplish the same function, and irrespective of the form of energization which it is adapted to receive, whether a pressure fluid energization, for instance, or other energization. The transmission 38, as shown, is arranged to be braked at the output side 36 thereof or else simultaneously unbraked and clutched together for a 1:1 direct drive. Yet, other conceivable forms of known transmissions involving a gear reduction may be employed, and indeed, it is not essential to the present invention that the flywheel shaft be directly connected to the output shaft for 1:1 drive, nor that a 1:1 be employed.

Variations within the spirit and scope of the invention described are equally comprehended by the foregoing description.

What is claimed is:

1. In a system incorporating a continuously operating main conveyor defining a path of travel for billets, an intermediate conveyor for receiving billets therefrom and being energizable to advance the billets, and reducer rolls energizable to perform a cycle of operation comprising grasping and roll-forming the billets individually so advanced by the intermediate conveyor, the combination of a motor having a pressure movable member, said motor being double acting so as to have opposite first and second directions of operation, a slide member connected to said pressure movable member for movement externally of said motor, and being arranged to move into and out of the immediate adjacency of said reducer rolls depending on the respective first and second directions of operation of said motor, separate control means for energizing each of said intermediate conveyor and said reducer rolls and first means for causing said motor to operate in said first direction and second means for causing said motor to operate in said second direction, said intermediate conveyor energizing means and said first means having an actuating element disposed generally near the intermediate conveyor and in the path of travel of the billet members on said main conveyor and being engageable by each billet to cause the motor to operate in said first direction and simultaneously to cause the intermediate conveyor to be energized for advancing such billet, said intermediate conveyor energizing means and said second means having an operating element for controlling the same, said operating element being carried by said slide as the latter is being moved into the adjacency of the reducer rolls and capable of limited movement relative to the slide, and being engageable by each advancing billet to cause the intermediate conveyor to be deenergized and the motor to operate said second direction, said reducer roll energizing control means including plunger mechanism engageable by at least one of the slide and advanced billet members to cause the reducer roll to perform a cycle of operation on such advanced billet member.

2. In a system incorporating a continuously operating main conveyor defining a path of travel for billets, an intermediate conveyor for receiving billets therefrom and being energizable to advance the billets, and reducer rolls energizable to perform a cycle of operation comprising grasping and roll-forming the billets individually so advanced by the intermediate conveyor, a motor having a pressure movable member, said motor being double acting so as to have opposite first and second directions of operation, a slide connected to said pressure movable member for movement externally of said motor, and being arranged to move into and out of the immediate adjacency of said reducer rolls depending on the respective first and second directions of operation of said motor, separate control means for energizing each of said intermediate conveyor and said reducer rolls and first means for causing said motor to operate in said first direction and second means for causing said motor to operate in said second direction, said intermediate conveyor energizing means and said first means having an actuating element disposed generally near the intermediate conveyor and in the path of travel of the billets on said main conveyor and being engageable by each billet to cause the motor to operate in said first direction and simultaneously to cause the intermediate conveyor ot be energized for advancing such billet, said intermediate conveyor energizing means and said second means having an operating element for controlling the same, said operating element being carried by said slide as the latter is being moved into the adjacency of the reducer rolls and capable of limited movement relative to the slide, and being engageable by each advancing billet to cause the intermediate conveyor to be deenergized and the motor to operate in said second direction, said reducer roll energizing control means including a valve plunger mechanism engageable by the slide to cause the reducer roll to perform a cycle of operation on such advanced billet.

3. In a system incorporating a continuously operating main conveyor defining a path of travel for billets, an intermediate conveyor for receiving billets therefrom and being energizable to advance the billets, and reducer rolls energizable to perform a cycle of operation comprising grasping and roll-forming the billets individually so advanced by the intermediate conveyor, a motor having a pressure movable member, said motor being double acting so as to have opposite first and second directions of operation, a slide member connected to said pressure movable member for movement externally of said motor, and being arranged to move into and out of the intermediate adjacency of said reducer rolls depending on the respective first and second directions of operation of said motor, separate control means for energizing each of said intermediate conveyor and said reducer rolls and first means for causing said motor to operate in said first direction and second means for causing said motor to operate in said second direction, said intermediate conveyor energizing means and said first means having an actuating element disposed generally near the intermediate conveyor and in the path of travel of the billet members on said main conveyor and being engageable by each billet to cause the motor to operate in said first direction and simultaneously to cause the intermediate conveyor to be energized for advancing such billet, said intermediate conveyor energizing means and said second means having an operating element for controlling the same, said operating element being carried by said slide as the latter is being moved into the adjacency of the reducer rolls and capable of limited movement relative to the slide, and being engageable by each advancing billet to cause the intermediate conveyor to be deenergized and the motor to operate in said second direction, said reducer roll energizing control means including plunger actuated means engageable by both of the slide and advanced billet members to cause the reducer roll to perform a cycle of operation on such advanced billet member.

4. In a system incorporating a main conveyor defining a path of travel for billets, an intermediate conveyor for receiving billets from the main conveyor and being operable to advance the billets so received, and forming-rolls energizable to perform a cycle of operation on the billets including grasping and individually forming the billets so advanced from the intermediate conveyor: means slidable between positions including a first position of immediate adjacency with respect to said forming-rolls and a second position to which the slidable means may be restored from said first position, an engageable element carried with the slidable means but capable of limited movement relative thereto and being arranged to obstruct the line of movement of each of said billets when the slidable means is in said first position and to be engaged by such advancing billet and moved thereby a slight distance with respect to said slidable means, a plurality of means energizable to operate the intermediate conveyor and to move said slidable means into the first said position, and having an actuating element associated with the main conveyor so as to be disposed in the path of travel of the billets therealong and engageably operated by each passing billet, means actuated in response to the above-described slight movement of the first-said engageable element to deenergize the means energizing said intermediate conveyor and to reverse the moving means for the slidable means so as to restore the slidable means to said second position, and means actuated in response to the just-named restoring movement of the sliding means to said second position to energize the forming-rolls to perform a cycle of operation on each said passing billet.

5. In a system incorporating a main conveyor defining a path of travel for billets, an intermediate conveyor for receiving billets from the main conveyor and being operable to advance the billets so received, and forming-rolls energizable to perform a cycle of operation on the billets including grasping and individually forming the billets so advanced from the intermediate conveyor: means slidable between positions including a first position of immediate adjacency with respect to said forming rolls and a second position to which the slidable means may be restored from said first position, an engageable element carried with the slidable means but capable of limited movement relative thereto and being arranged to obstruct the line of movement of each of said billets when the slidable means is in said first position and to be engaged by such advancing billet and moved thereby a slight distance with respect to said slidable means, a plurality of means energizable to operate the intermediate conveyor and to move said slidable means into the first said position, and having an actuating element associated with the main conveyor so as to be disposed in the path of travel of the billets therealong and engageably operated by each passing billet, means actuated in response to the above-described slight movement of the first-said engageable element to deenergize the means energizing said intermediate conveyor and to reverse the moving means for the slidable means so as to restore the slidable means to said second position, and means actuated in response to the just-named restoring movement of the sliding means to said second position to energize the forming rolls to perform a cycle of operation on each said passing billet, said last-named means including a disabling device which is normally closed to prevent energization of said forming rolls and having a swingable operating member for opening the same whenever a billet approaches said forming rolls.

6. In a system incorporating a main conveyor defining a path of travel for billets, an intermediate conveyor for receiving billets from the main conveyor and being operable to advance the billets so received, and forming rolls energizable to perform a cycle of operation on the billets including grasping and individually forming the billets so advanced from the intermediate conveyor: a carriage connected by a weak connection to a fixed support and arranged to carry means slidable between positions including a first position of immediate adjacency with respect to said forming rolls and a second position to which the slidable means may be restored from said first position, an engageable element carried by and with the slidable means but capable of limited movement relative thereto and being arranged to obstruct the line of movement of each of said billets when the slidable means is in said first position and to be engaged by such advancing billet and moved thereby a slight distance with respect to said slidable means, a plurality of means energizable to operate the intermediate conveyor and to move said slidable means into the first said position, and having an actuating element associated with the main conveyor so as to be disposed in the path of travel of the billets therealong and engageably operated by each passing billet, means actuated in response to the above-described slight movement of the first-said engageable element to deenergize the means energizing said intermediate conveyor and to reverse the moving means for the slidable means so as to restore the slidable means to said second position, means actuated in response to the just-named restoring movement of the sliding means to said second position to energize the forming-rolls to perform a cycle of operation on each said passing billet, and safety dogs connected to the forming rolls for striking the slidable means free of the same by breaking said weak connection in event of failure of said slidable means to be restored from said first position prior to energization of the forming rolls.

7. For use with a first conveyor so as to receive billets therefrom and intermittently cause the same to be roll-formed through a set of rolls, the combination comprising a conveyor intermediate the first conveyor and the rolls and series-arranged to provide a path of movement of billets therebetween, a carriage swingably mounted to a fixed support disposed at one side of the rolls and further having a weak connection to said fixed support for normally preventing relative swinging movement between said carriage and support, means slidably related to said carriage and carrying an element capable of slight movement with respect to said means, said element being arranged to be in the path of each moving billet and to be actuated by being at least slightly contactedly moved thereby upon said slidable means being operated into and assuming a first position transversely across the path of movement of the billets, a plurality of devices energizable to operate said intermediate conveyor and to operate said slidable means into the first position aforesaid, one device of said plurality comprising a reversible mechanism for reversibly moving said slidable means from said first position into a restored position removed from being transversely across the path of movement of the billets, control means for causing said plurality of devices to be energized to operate said slidable means and said intermediate conveyor, and including an actuating member movable by each of the passing billets on the first conveyor to actuate said control means, control means operated in response to the slight movement of actuation aforesaid of said element and effective to deenergize said intermediate conveyor and to cause the reversible mechanism of said one device to move said slidable means into the aforesaid restored position, means responsive to said slidable means being moved into and assuming said restored position for causing said set of rolls to perform a roll-forming cycle of operation on the billet last in contact with said element, and roll clearing means carried by said set of rolls for engaging the slide carried by the swingably mounted carriage and striking the same free of the rolls by breaking said weak connection between said carriage and said support.

8. For use with a first conveyor so as to receive billets therefrom and intermittently cause the same to be roll-formed through a set of rolls, the combination comprising a conveyor intermediate the first conveyor and the roll and series-arranged in the path of movement of billets therebetween, a carriage mounted to a fixed support disposed at one side of the rolls, means slidably related to said carriage and carrying an element capable of slight movement with respect to said means, said just-named element being arranged to be in the path of each moving billet and to be actuated by being at least slightly contactedly moved thereby upon said slidable means being operated into and assuming a first position transversely across the path of movement of the billets, a plurality of devices energizable to operate said intermediate conveyor and to operate said slidable means into the first position aforesaid, one device of said plurality comprising a reversible mechanism for reversibly moving said slidable means from said first position into a restored position removed from being transversely across the path of movement of the billets, control means for causing said plurality of devices to be energized to operate said slidable means and said intermediate conveyor, and including an actuating member movable by each of the passing billets on the first conveyor to actuate said control means, control means operated in response to the slight movement of actuation aforesaid of said element and effective to deenergize said intermediate conveyor and to cause the reversible mechanism of said one device to move said slidable means into the aforesaid restored position, and means moved in response to said slidable means being moved into said restored position for causing said set of rolls to perform a roll-forming cycle of operation on the billet last in contact with said element.

9. For use with a first conveyor so as to receive billets therefrom and intermittently cause the same to be roll-formed through a set of rolls, the combination comprising a conveyor intermediate the first conveyor and the rolls and series-arranged in the path of movement of billets therebetween, a carriage mounted to a fixed support disposed at one side of the rolls, means slidably related to said carriage and carrying an element capable of slight movement with respect to said means, said just-named element being arranged to be in the path of each moving billet and to be actuated by being at least slightly contactedly moved thereby upon said slidable means being operated into and assuming a first position transversely across the path of movement of the billets, a plurality of devices energizable to operate said intermediate conveyor and to operate said slidable means into the first position aforesaid, one device of said plurality comprising a reversible mechanism for reversibly moving said slidable means from said first position into a restored position removed from being transversely across the path of movement of the billets, control means for causing said plurality of devices to be energized to operate said slidable means and said intermediate conveyor, and including an actuating member movable by each of the passing billets on the first conveyor to actuate said control means, first control means operated in response to the slight movement of actuation aforesaid of said element and effective to deenergize said intermediate conveyor and to cause the reversible mechanism of said one device to move said slidable means into the aforesaid restored position, second control means moved in response to said slidable means being moved into said restored position for causing said set of rolls to perform a roll-forming cycle of operation on the billet last in contact with said element, and safety means cooperatively associatde with said second control means and normally effective to prevent said set of rolls from performing a cycle of operation, said safety means having a control element therefor arranged to be engageable by each billet as it occupies a portion of said intermediate conveyor to disable said safety means just prior to the desired performance of a roll-forming cycle of operation on such billet.

References Cited in the file of this patent

UNITED STATES PATENTS

| | | |
|---|---|---|
| 1,469,575 | Baehr | Oct. 2, 1923 |
| 2,065,855 | Ferm | Dec. 29, 1936 |
| 2,110,257 | Bennett | Mar. 8, 1938 |
| 2,615,355 | Friedman | Oct. 28, 1952 |